United States Patent [19]

Huff

[11] 4,407,579
[45] Oct. 4, 1983

[54] PHOTOGRAPHIC FILM ASSEMBLAGE

[75] Inventor: Joseph F. Huff, Hyde Park, Mass.

[73] Assignee: Polaroid Corporation, Cambridge, Mass.

[21] Appl. No.: 374,504

[22] Filed: May 3, 1982

[51] Int. Cl.³ .............................................. G03B 17/26
[52] U.S. Cl. ..................................... 354/275; 242/71.1
[58] Field of Search ................. 354/275; 242/71, 71.1, 242/71.9

[56] References Cited

U.S. PATENT DOCUMENTS

| | | | |
|---|---|---|---|
| 2,541,476 | 2/1951 | Mihalyi | 242/71 |
| 3,261,237 | 7/1966 | Sentiff | 81/3 |
| 3,695,160 | 10/1972 | Stockdale | 95/31 CA |
| 3,705,696 | 12/1972 | Edwards et al. | 242/71.2 |
| 3,864,993 | 2/1975 | Hovind | 81/3 R |
| 4,034,393 | 7/1977 | Goldmacher | 354/354 |
| 4,047,653 | 9/1977 | Starr | 226/92 |
| 4,145,133 | 3/1979 | Wareham | 354/275 |
| 4,212,527 | 7/1980 | Fischer | 354/275 |

FOREIGN PATENT DOCUMENTS 21688  3/1930  Australia ............................ 242/71.1

Primary Examiner—John Gonzales
Attorney, Agent, or Firm—Alfred E. Corrigan

[57] ABSTRACT

A photographic film assemblage wherein a film spool which supports a roll of film is comprised of two pieces constructed so as to telescopically receive each other. Each piece includes a radially extending flange which is adapted to be located closely adjacent to but not in engagement with a side of the roll of film. The spool is rotatably supported within a housing having a lighttight passageway through which a leading end of the film may extend to the exterior of the housing. To move the leading end into and through the passageway so as to make it available at the exterior of the housing for connection to a film winding mechanism, one merely applies inwardly directed pressure to the opposite ends of the spool so as to move the flanges into contact with the sides of the roll of film. With the film thus confined by the flanges, and while maintaining said pressure, relative rotation in a predetermined direction between the spool and the housing will result in the leading end of the film being moved into and through the passageway. The coefficient of friction of the facing surfaces of the two flanges may be increased by any suitable means so as to increase their gripping effect on the edges of the roll of film. Once the pressure is removed from the ends of the spool, the flanges return to their original positions where they are for all practical purposes out of engagement with the edges of the film.

8 Claims, 9 Drawing Figures

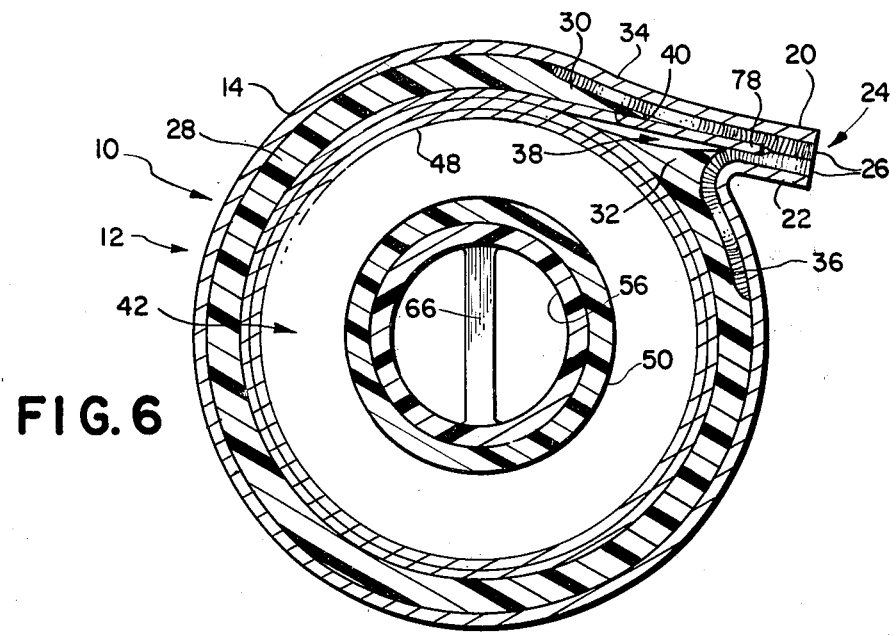
FIG. 6
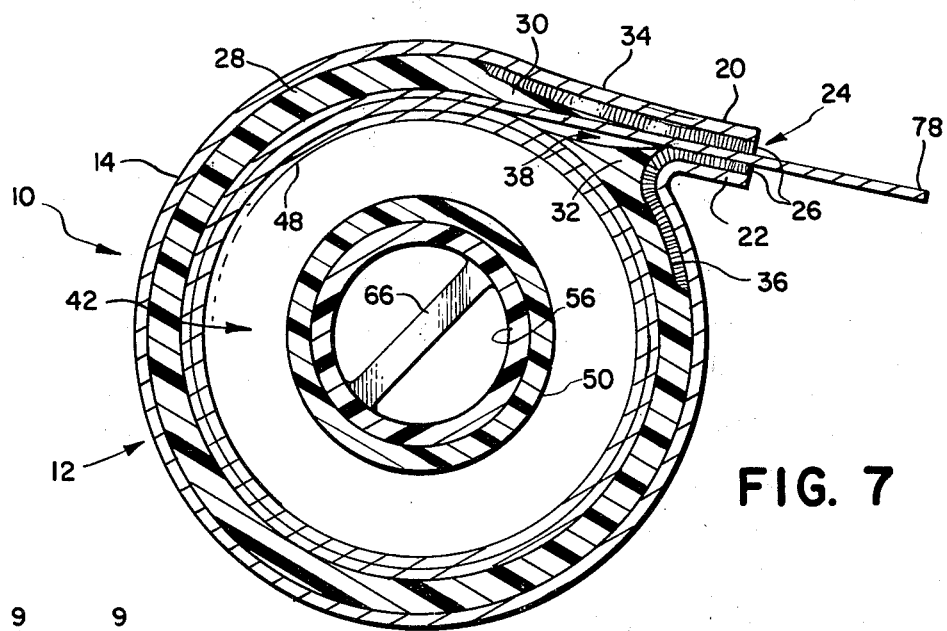
FIG. 7
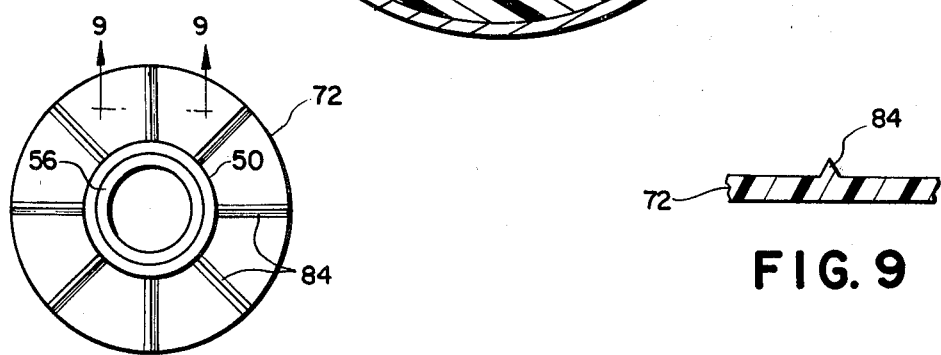
FIG. 8
FIG. 9

PHOTOGRAPHIC FILM ASSEMBLAGE

RELATED APPLICATIONS

Reference is made to the following commonly-assigned, copending U.S. patent applications: Ser. No. 251,142, filed Apr. 6, 1981, in the name of Vincent L. Cocco, and entitled FILM RETRIEVER; and Ser. No. 364,804, filed Apr. 2, 1982, in the name of Nicholas Gold, and entitled PHOTOGRAPHIC FILM ASSEMBLAGE.

BACKGROUND OF THE INVENTION

1. Field of the Invention

The invention relates to a photographic film assemblage having means for enabling a leading end of a strip of film to be easily retrieved or moved from within a film cassette.

2. Description of the Prior Art

The present invention relates to a photographic film assemblage of the type including a housing having a lighttight exit or passageway through which a leading end of a strip of film is adapted to be moved to the exterior of the housing so as to enable it to be attached to a film advance mechanism of a camera or film processor and, more particularly, to such an assemblage which includes means for retrieving such leading end should it be inadvertently, or otherwise, located within the housing.

Among amateur and professional photographers, one of the most popular film formats is the 35 millimeter size. In the 35 millimeter system, the film is normally carried on a spool within a lighttight cylindrical cassette. Despite its popularity, this system has the disadvantage that, when the cassette is to be removed from the camera, the film must first be rewound into the cassette to avoid exposure to light. Several 35 millimeter cameras do not provide any accurate method of rewinding the film without causing the leading end of the film (the leader) to pass through the exit or passageway into the cassette. Once the leader is in the cassette, it is very difficult to retrieve it in order to process the film or to use any unexposed portions of the film at a later time.

This loss of the leader or leading end of the film occurs in two very different situations. When the roll of film has been completely photographically exposed, it is rewound into the cassette; and it is desirable to have the leader available to remove the film from the cassette for processing. If the leader is not available, the cassette can be broken open to allow removal of the film. While this approach can be somewhat difficult and inconvenient for both the amateur and commercial processor, it is a viable solution. This leader is also lost in the situation where the photographer has partially used a roll of film and desires to change to another type of film. The photographer must return the original film to the interior of the cassette; and, in doing so, the leader is often lost, i.e., moved to a position totally within the film cassette. If the photographer does not wish to waste the underexposed portion of the original roll of film, he must somehow retrieve the leader. He may, of course, break open the cassette, which must be done in a dark room, but in the process, often ruins the cassette so that the film cannot be used without obtaining a new cassette.

Some have attempted to obviate this problem by preventing the leading end of the film from being fully rewound into the film cassette in the first place. For example, the film cartridges disclosed in U.S. Pat. Nos. 3,695,160 and 3,705,696 are each provided with an integrally-molded projection, which is adapted to enter a perforation in an end of a filmstrip to thereby preclude its entry into a take-up chamber. See also U.S. Pat. Nos. 4,145,133 and 4,212,527, wherein the leading end of a filmstrip is disfigured in a manner to preclude its entry into a film cassette. Also, see U.S. Pat. No. 4,034,393 wherein a hook is secured to the leading end of the film to prevent its movement into a film cassette. While these proposed solutions may have certain attributes, they are subject to the criticism that they may result in the filmstrip being torn, or otherwise damaged, if one were to continue to try to rewind the filmstrip after it had been stopped; and, such continued rewinding may damage the rewinding mechanism of the camera in which the film is located.

Others have recognized the value of being able to retrieve the leading end of the film without ruining the film, the cassette and/or the camera. For example, U.S. Pat. No. 3,261,237 describes a tool which can reach into the film cassette and retrieve the leading end of the film. U.S. Pat. Nos. 3,864,993 and 4,047,653 describe similar tools. However, these tools require proper manipulation and are subject to being misplaced in the workshop.

As is well known, the leading end of a roll of 35 mm film is generally located outside of the film cassette such that it may be readily attached to the film advance mechanism of a camera. However, this increases the chances that the film may be prematurely exposed due to the leading end of the film being inadvertently pulled so as to withdraw a larger length of film than usual prior to the film being loaded into a camera. Another disadvantage in having the leading end of the film originally located exteriorly of the film cassette is that one or more layers of the film may be formed of a material, such as polyester film, which is capable of "lightpiping", i.e., transmitting light along its length so as to eventually fog an adjacent photosensitive layer. Accordingly, ambient light striking an exteriorly located leading end of a length of film would be transmitted by the polyester film to the interior of the film cassette where it may fog the photosensitive layer of the film. Thus, the intensity of the ambient light incident upon the light transmitting layer and/or the period of time of exposure to such light are factors which could result in the fogging of the film. For the above reasons, it may be advantageous to package the film with its leading end or leader located within the film cassette and to provide a simple means whereby the photographer may retrieve the leading end prior to loading the film into a camera.

SUMMARY OF THE INVENTION

The instant invention relates to a photographic film assemblage, preferably of the type adapted for use in handheld cameras of the 35 mm type and, more particularly, to such an assemblage which is constructed such that a leading end of a roll of film may be easily moved to the exterior of a housing where it may be manually grasped so as to attach it to a film advance mechanism of a camera or film processor.

The film assemblage includes a film cassette comprised of a cylindrical housing having a pair of end caps. The housing is constructed so as to define a lighttight passageway through which a length of film is adapted to be moved. The film includes a trailing end which is adapted to be secured to a film spool and a leading end which is adapted to be moved through the passageway so as to be accessible exteriorly of the cassette. The film spool includes first and second members which are constructed such that they are telescopically connected to each other for relative movement along the longitudinal axis of the spool. Each of the first and second members is provided with a radially extending flange, which flanges are adapted to insure that the film travels in a direction perpendicular to the axis of the spool as it is unwound from or rewound upon the spool. The inwardly facing surfaces of the flanges are preferably provided with a surface having a high coefficient of friction. For example, a layer of resilient material such as rubber may be secured to the inwardly facing surfaces of the flanges. Alternatively, the surfaces themselves may be roughened so as to increase their coefficient of friction.

The maximum diameter of the roll of film is controlled by a hollow cylindrical insert in which the roll of film is adapted to be located. The insert is secured to the internal wall of the housing such that a longitudinally extending opening in the insert is located in alignment with the lighttight passageway in the housing. The insert is preferably molded from a polystyrene such that it has a hard, low friction internal surface for guiding the leading end of the film toward the opening which, in turn, guides it into the lighttight passageway.

Each of the members of the spool includes a journal which is rotatably supported in an aperture in one of the end caps of the cassette, as is well known in the art. When it is desired to move the leading end of the film from within the cassette, the photographer merely applies inwardly directed pressure on the journals, such as by the thumb and index finger of one hand, thereby causing the inwardly facing surfaces of the flanges to move into engagement with the opposite sides of the film which is coiled upon the spool. While maintaining said pressure, the photographer may rotate the film cassette with his other hand in a predetermined direction about the longitudinal axis of the spool until the lighttight passageway presents itself to the leading end of the film. Note, during such rotation the leading end of the film does not move because of the frictional forces being applied to the sides of the roll of film by the inwardly facing surfaces of the flanges. Continued rotation of the cassette results in the leading end of the film passing through the lighttight passageway to the exterior of the cassette, the resistance to the movement of the film through the passageway by the light blocking material being overcome by the forces being applied to the sides of the roll of film and by the film's own beam strength. Alternatively, the photographer may hold the cassette against rotation and provide a rotating force in a predetermined direction to the journals while simultaneously maintaining the inwardly directed force on the journals. This action will result in the roll of film including its leading end being rotated relative to the insert until the leading end "sees" and enters the lighttight passageway and passes therethrough.

An object of the invention is to provide a photographic film assemblage from which a leading end of a roll of film may be withdrawn merely by relative rotation between the housing and the roll of film.

Another object of the invention is to provide a photographic film assemblage with a film spool which has a pair of flanges that are manually movable into engagement with the sides of a roll of film so as to prevent relative movement therebetween.

Other objects of the invention will in part be obvious and will in part appear hereinafter.

The invention accordingly comprises the photographic film assemblage possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIGS. 5-7 are views similar to FIG. 4 showing the leading end of a strip of film as it approaches and is advanced through a lighttight passageway in a film cassette;

FIG. 8 is an elevational view of an alternative type of face for a film spool flange; and FIG. 9 is a cross-sectional view taken along the line 9—9 of FIG. 8.

DETAILED DESCRIPTION OF THE INVENTION

Figure 1:
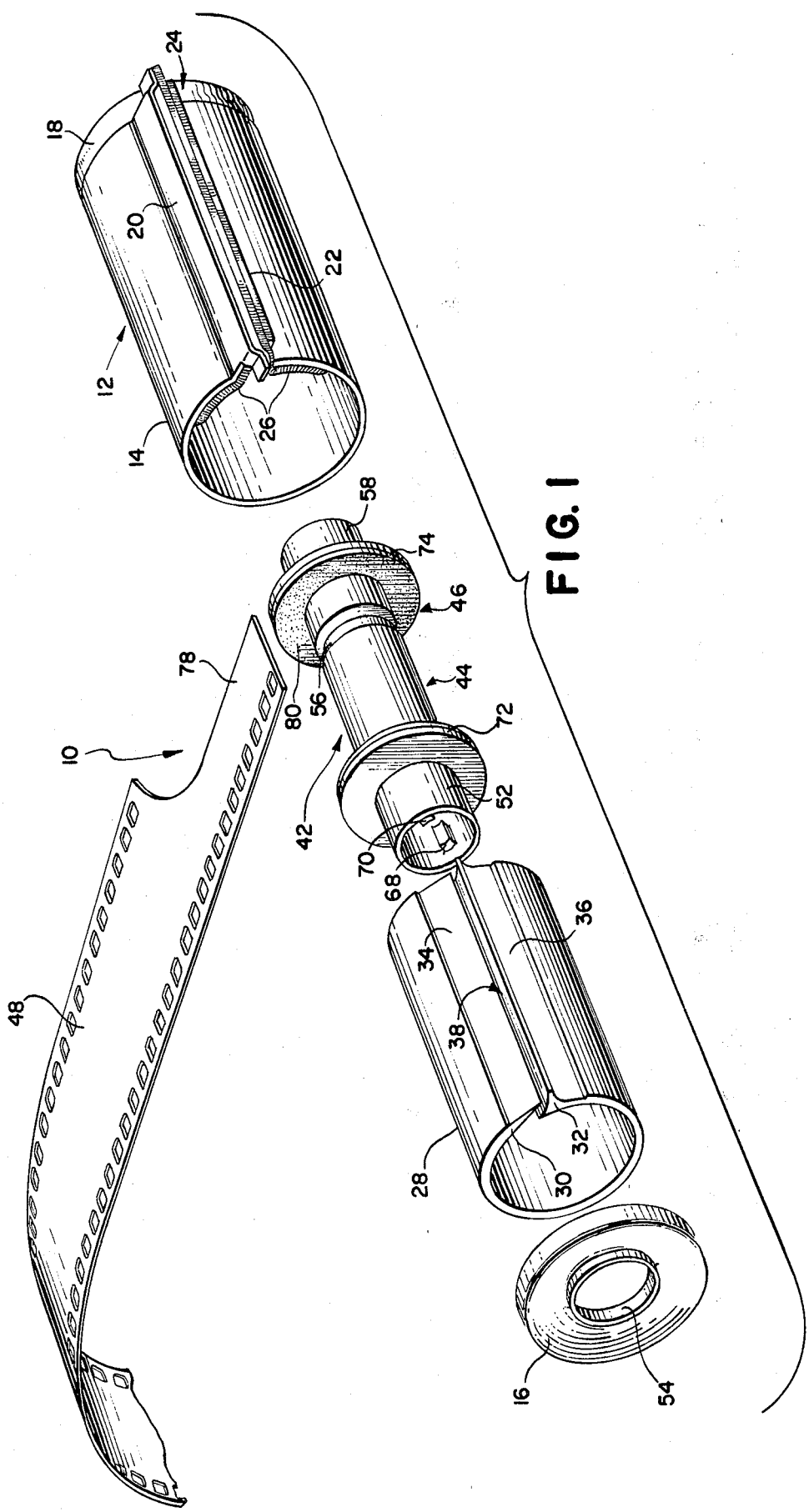
FIG. 1 is an enlarged, partially exploded, perspective view of a preferred embodiment of a photographic film assemblage.

Reference is now made to the drawings and, in particular, to FIGS. 1-7, wherein is shown a preferred embodiment of a photographic film assemblage 10. The photographic film assemblage includes a film cassette 12 comprised of a generally cylindrically configured housing 14, the ends of which have a friction fit with a pair of end caps 16 and 18. Sections 20 and 22 of the housing 14 are stamped or molded so as to define a passageway 24 through which a length of photographic film is adapted to be advanced to the exterior of the film cassette 12. The passageway 24 is rendered lighttight by any suitable means such as flocking 26 which is secured to the internal surface of the housing 14 and the facing surfaces of the sections 20 and 22. Also secured to the internal surface of the housing 14 is a cylindrically configured insert 28, the ends 30 and 32 of which are recessed at 34 and 36, respectively, to provide clearance for the flocking 26, as best seen in FIGS. 4-7. The ends 30 and 32 also cooperate with each other to define a longitudinally extending slot or opening 38 which is located in alignment with the lighttight passageway 24 in the housing 14. The insert 28 is preferably formed so as to have a relatively smooth low friction inner surface 40.

Figure 2:
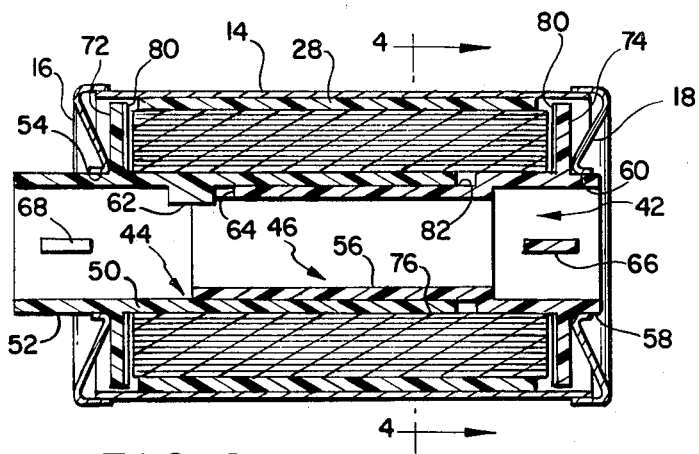
FIG. 2 is a cross-sectional view showing the film assemblage of FIG. 1 in an assembled state, the section being taken generally along the longitudinal axis of the assemblage.
Figure 3:
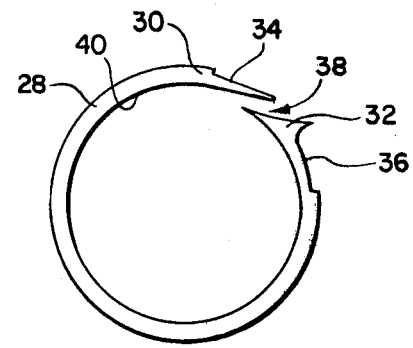
FIG. 3 is an end view of an insert which comprises an element of the photographic film assemblage of FIG. 1.

As is best shown in FIG. 2, the insert 28 encircles a film spool 42. The film spool 42 is comprised of first and second members 44 and 46 which are constructed to telescopically receive each other such that they may be moved relative to each other along the longitudinal axis of the film spool 42, i.e., the axis about which the film spool rotates during winding and rewinding of a strip of film 48. The first member 44 includes a barrel 50 having a journal 52 at one end thereof which is rotatively supported by an aperture 54 in the end cap 16. The second member 46 includes a barrel 56 having a journal 58 at one end which is rotatively supported by an aperture 60 in the end cap 18. The diameter of the barrel 56 is approximately equal to the inside diameter of the barrel 50 whereby the former is easily received within the latter. To prevent relative rotation between the two members 44 and 46, a key 62 extends from the inner surface of the barrel 50 and is adapted to be located within a longitudinally extending keyway 64 in the second member 46. A flange 66 extends between diametrically opposite points of the interior surface of the journal 58 while a pair of flanges 68 and 70 extend toward each other from diametrically opposite points on the interior surface of the journal 52. As is well known, these flanges are used to drive the film spool 42 during the rewinding of the film 48 upon the film spool 42. Each of the members 44 and 46 also includes a radially extending flange 72 and 74, respectively. When the film assemblage 10 is assembled, as shown in FIG. 2, the inwardly facing surfaces of the flanges 72 and 74 lie in planes closely adjacent to, but not in engagement with, the sides of the roll of film 48 which is coiled about the film spool 42. Further, the maximum diameter of the flanges 72 and 74 is selected such that it is greater than the inside diameter of the insert 28 thereby insuring that the film 48 will not mistrack and move to a position on the periphery of one of the flanges 72 and 74.

The film 48 includes a trailing end 76 which is attached to the barrel 50 and a tapered leading end or leader 78 which is adapted to be attached to a film advancing mechanism of a camera or film processing apparatus.

Preferably, the film assemblage 10 is packaged with the leading end 78 of the film 48 located within the film cassette 12. When it is desired to load the film assemblage 10 into a camera for subsequent exposure of the film 48, or into a film processor for processing exposed film, one merely grasps the journals 52 and 58 between the thumb and a finger of one hand and applies inwardly directed pressure thereon along the longitudinal axis of the film spool 42 so as to force the first and second members 44 and 46 toward each other. This action results in the inwardly facing surfaces of the flanges 72 and 74 moving from the positions shown in FIG. 2 into engagement with the opposite sides of the roll of film 48. Each of the inwardly facing surfaces of the flanges 72 and 74 is preferably provided with material 80 having a high coefficient of friction, e.g., rubber or rubber impregnated fabric, so as to better enable it to prevent the film 48 from rotating relative to the material 80 when the two are in engagement with each other. While maintaining this pressure, the film cassette 12 is then rotated in a predetermined direction by the other hand until the lighttight passageway 24 presents itself to the leading end 78 of the film 48. Further rotation of the film cassette 12 in said direction is effective to drive the leading end 78 of the film 48 through the lighttight passageway 24 to the exterior of the film cassette 12. During this relative rotation between the film cassette 12 and the film spool 42, the film 48 is maintained against movement relative to the film spool 42 by the frictional forces being applied to the film 48 by the material 80.

Figure 4:
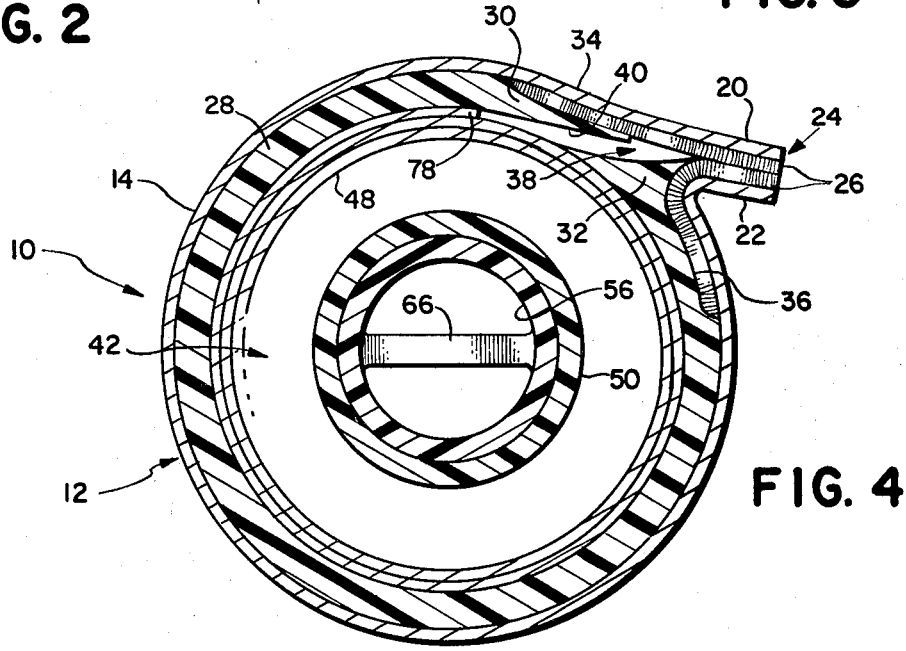
FIG. 4 is a cross-sectional view of the photographic film assemblage taken generally along the line 4—4 of FIG. 2.
Figure 5:
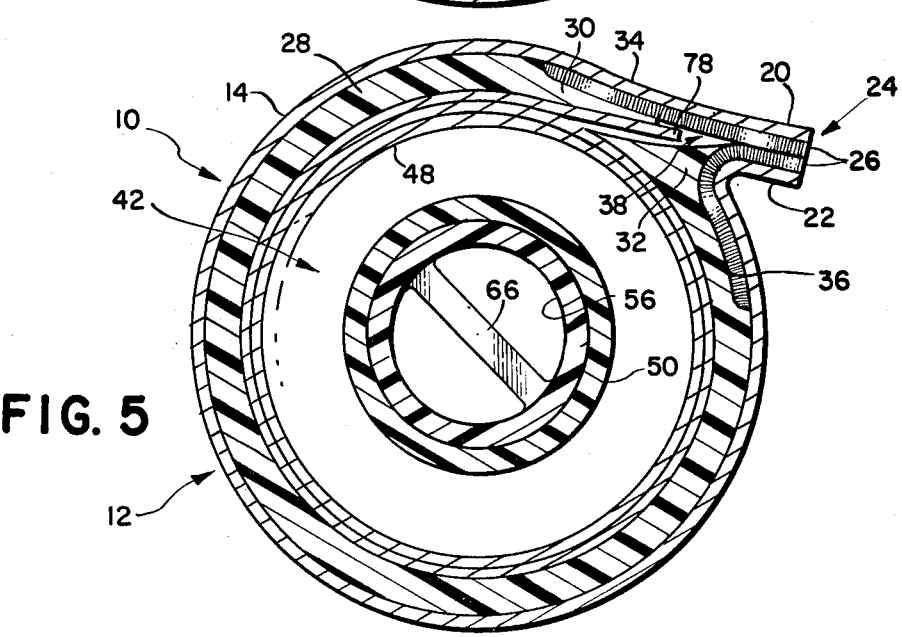

Conversely, one may move the leading end 78 of the film 48 to the exterior of the film cassette 12 by holding the film cassette 12 against rotative movement and applying a rotative force to the ends of journals 52 and 58 while simultaneously applying said aforementioned inwardly directed pressure to the same journals. This action is graphically depicted in FIGS. 4–7. In FIG. 4, the leading end 78 of the film 48 is located wholly within the film cassette 12. In FIG. 5, the film spool 42 has been rotated in a predetermined direction, in this case clockwise, thereby moving the leading end 78 of the film 48 into the opening 38 in the insert 28. Still further rotation of the film spool 42 and the roll of film moves the leading end 78 into the lighttight passageway 24, as shown in FIG. 6, until it finally emerges from the film cassette 12, as shown in FIG. 7. After the leading end 78 of the film 48 has been moved to the exterior of the film cassette 12, pressure on the journals 52 and 58 may be released and the resiliency of the material 80 will move the two members 44 and 46 of the film spool to the position shown in FIG. 2 where, for all practical purposes, the material 80 is out of engagement with the sides of the roll of film 48. Alternatively, a resilient member such as a rubber O-ring may be located in an annular space 82, see FIG. 2, located between one end of the barrel 50 and the journal 58 for accomplishing the same purpose.

An alternative means of increasing the coefficient of friction of the inwardly facing surfaces of the flanges 72 and 74 is shown in FIGS. 8 and 9. Here, the inwardly facing surface of the flange 72 is constructed with integral, radially extending, ribs 84. The corresponding face of the other flange is similarly constructed.

Since certain changes may be made in the above-described photographic film assemblage without departing from the scope of the invention herein involved, it is intended that all matter contained in the above description or shown in the accompanying drawings shall be interpreted as illustrative and not in a limiting sense.

What is claimed is:

1. A photographic film assemblage comprising:
   a cassette having means defining a lighttight passageway through which a strip of photographic film is adapted to be advanced to the exterior of said cassette;
   a roll of photographic film having a leading and trailing end; and
   a spool rotatably supported within said cassette with said roll of film coiled around said spool and with said trailing end being attached to said spool, said spool having a longitudinal axis and being comprised of first and second members connected to each other for movement relative to each other along said longitudinal axis, each of said first and second members includes a radially extending flange having friction producing means on a face thereof which is adapted to lie in a plane closely adjacent to a side of said roll of film, each of said first and second members further includes means extending to the exterior of said cassette where they may be manually grasped and moved toward each other thereby moving said friction producing means on said flanges into firm engagement with the opposite sides of said roll of film whereby relative rotation between said spool and said cassette about said longitudinal axis in a predetermined direction is then effective to move said leading end of said roll of film into and through said lighttight passageway.

2. A photographic film assemblage as defined in claim 1 wherein said friction producing means includes a layer of resilient material.

3. A photographic film assemblage as defined in claim 2 wherein said friction producing material includes rubber.

4. A photographic film assemblage as defined in claim 1 wherein said friction producing means comprises a plurality of radially extending ribs.

5. A photographic film assemblage as defined in claim 1 further including means for guiding said leading end of said film into said passageway.

6. A photographic film assemblage as defined in claim 5 wherein said guiding means has a coefficient of friction substantially less than that of said friction producing means.

7. A photographic film assemblage as defined in claim 6 wherein said guiding means substantially encompasses said roll of film and includes an opening located in alignment with said passageway.

8. A photographic film assemblage as defined in claim 7 wherein said guiding means restricts the maximum diameter of said roll of film to a value less than the diameter of said flanges.

* * * * *